Patented June 29, 1937

2,085,210

UNITED STATES PATENT OFFICE 2,085,210

PREPARATION FOR TREATING SCALY BARK

Engle A. Boele, Pasadena, Calif.

No Drawing. Application November 14, 1936, Serial No. 110,927

2 Claims. (Cl. 167—14)

This invention relates to the treatment of psorosis, commonly known in California as "scaly bark", a bark disease of citrus trees, particularly sweet oranges, although grapefruit and tangerines are also susceptible.

An object of the invention is to provide a simple and inexpensive and effective treatment for citrus trees infected with psorosis.

This application is in part a continuation of my application, Serial No. 39,629, filed September 7, 1935.

Psorosis causes dying and scaling of the bark of affected trees in patches or areas which slowly enlarge from year to year. The scaling may be accompanied with gumming. At first only the outer bark is affected, but in the later stages the wood is affected, becoming brown or stained. If the disease is not checked, the tree is seriously weakened, many of the branches dying back, and the productivity is impaired. The disease is discussed in detail in Bulletin 395 of the University of California, entitled "Bark Diseases of Citrus Trees in California", by Dr. H. S. Fawcett, to which reference is made.

Heretofore, to the best of my knowledge, the only known method of combatting psorosis after it has become established has been to scrape away the diseased bark. This mode of treatment is described in detail in the aforementioned bulletin. It is of interest to note that Dr. Fawcett found scraping to be more important than the use of any tried fungicide or disinfectant and that the use of a disinfectant following scraping was recommended merely as a matter of precaution. The bulletin lists as disinfectants and fungicides that may be employed: potassium permanganate, coal tar products, mercuric chloride, mercuric cyanide, emulsified cresol and Bordeaux paste.

To the best of my knowledge, the only heretofore known method of treatment considered to have any value, involved this scraping by hand of each and every infected area of the tree, which is laborious and expensive.

In accordance with the present invention, I successfully treat trees infected with psorosis by spraying the diseased areas with a special preparation, without scraping. A formula for this preparation is as follows:

| | |
|---|---|
| Lye | 72 ounces |
| Potassium permanganate | 2 tablespoonfuls |
| Lysol | 2½ ounces |
| Salt | 1 tablespoonful |
| Water | 12 gallons |

The lye is first dissolved in the water and allowed to stand for about fifteen hours. Then the potassium permanganate is separately dissolved in a small amount of water (about one quart) and added and the mixture allowed to stand for about an hour. Then the Lysol is added and the mixture allowed to stand for another hour, after which the salt is dissolved and added and the mixture thoroughly strained. Following the addition of Lysol, a very fine flocculent precipitate is produced, which readily remains in suspension and is not removed by the straining operation. Although I have not been able to ascertain positively, I believe this precipitate, which is apparently a phenolic compound resulting from interreaction between the Lysol and the potassium permanganate, and/or lye, is the active ingredient of my preparation.

Lysol is a trade-marked preparation which, as disclosed on page 150 of volume 1 of "The Chemical Formulary" by Bennett, published by the Chemical Publishing Company of New York, Inc., can be made by dissolving 25.5 grams of caustic soda in 140 c. c. of water, warming this and adding it to a warmed mixture of 500 c. c. cresylic acid and 180 c. c. rozolin; stirring thoroughly and adding water to make 1000 c. c.

The preparation is sprayed on the trunk and limbs of the diseased trees in sufficient quantities to thoroughly wet the bark, care being taken to avoid wetting the foliage with the preparation. If the leaves are sprayed they are burned and drop off, after which new leaves come out.

If the tree is only slightly diseased, it is sufficient to spray the trunk from the roots up to the branches but if badly infected, the main branches should also be sprayed.

It does not appear to be essential that all infected bark areas be wetted with the preparation in order to effect a cure. Because of this fact, I am led to the belief that my preparation, or some ingredients thereof, penetrate into the sap stream of the tree and is carried by the sap to distant limbs and twigs, becoming effective wherever the disease exists.

Ordinarily, several treatments as described, at intervals of two to three months apart, are required to effect a cure, the number depending upon the condition of the tree.

I have determined, and believe it is generally recognized in the art, that none of the ingredients of my preparation, when used alone, is effective against psorosis when merely applied to a tree without first scraping away the diseased bark. In view of these findings, I am convinced that the ingredients of my preparation, when combined, perform a function in the treatment of psorosis which they are incapable of performing when used separately.

The invention is applicable to the treatment of shell bark in lemon trees, as well as scaly bark in orange trees, and in fact, is applicable to any tree suffering from psorosis or kindred diseases.

I claim:

1. A preparation for treating psorosis in citrus trees comprising a dilute aqueous mixture of lye, "Lysol" and potassium permanganate.

2. A preparation for treating psorosis in citrus trees comprising a mixture of lye, "Lysol", potassium permanganate and water in the approximate proportion of 72 ounces of lye, 2½ ounces of "Lysol", 2 tablespoonfuls of potassium permanganate, and 12 gallons of water.

ENGLE A. BOELE.